Oct. 18, 1927.
C. HINDE
1,645,992
PORTABLE CONTAINER
Filed April 1, 1925
3 Sheets-Sheet 1
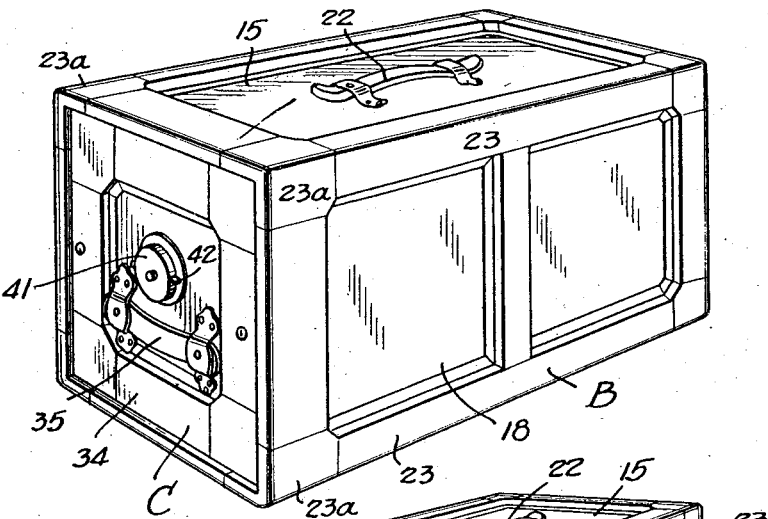
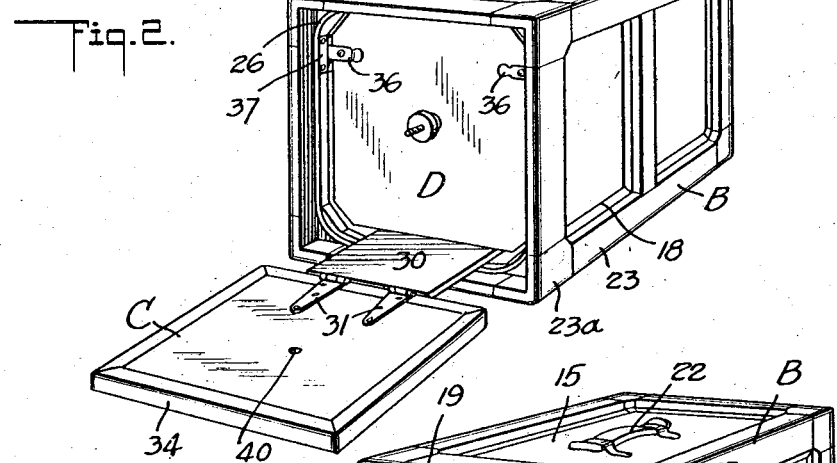
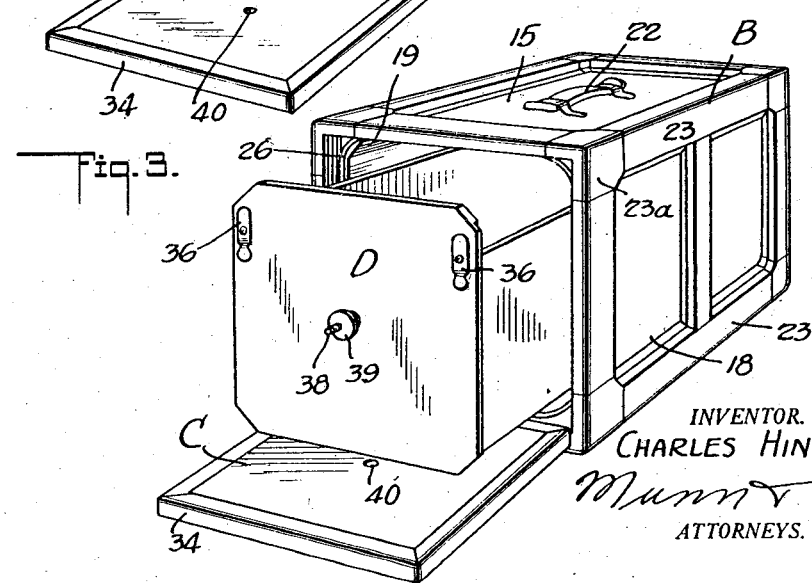
INVENTOR.
CHARLES HINDE
ATTORNEYS.

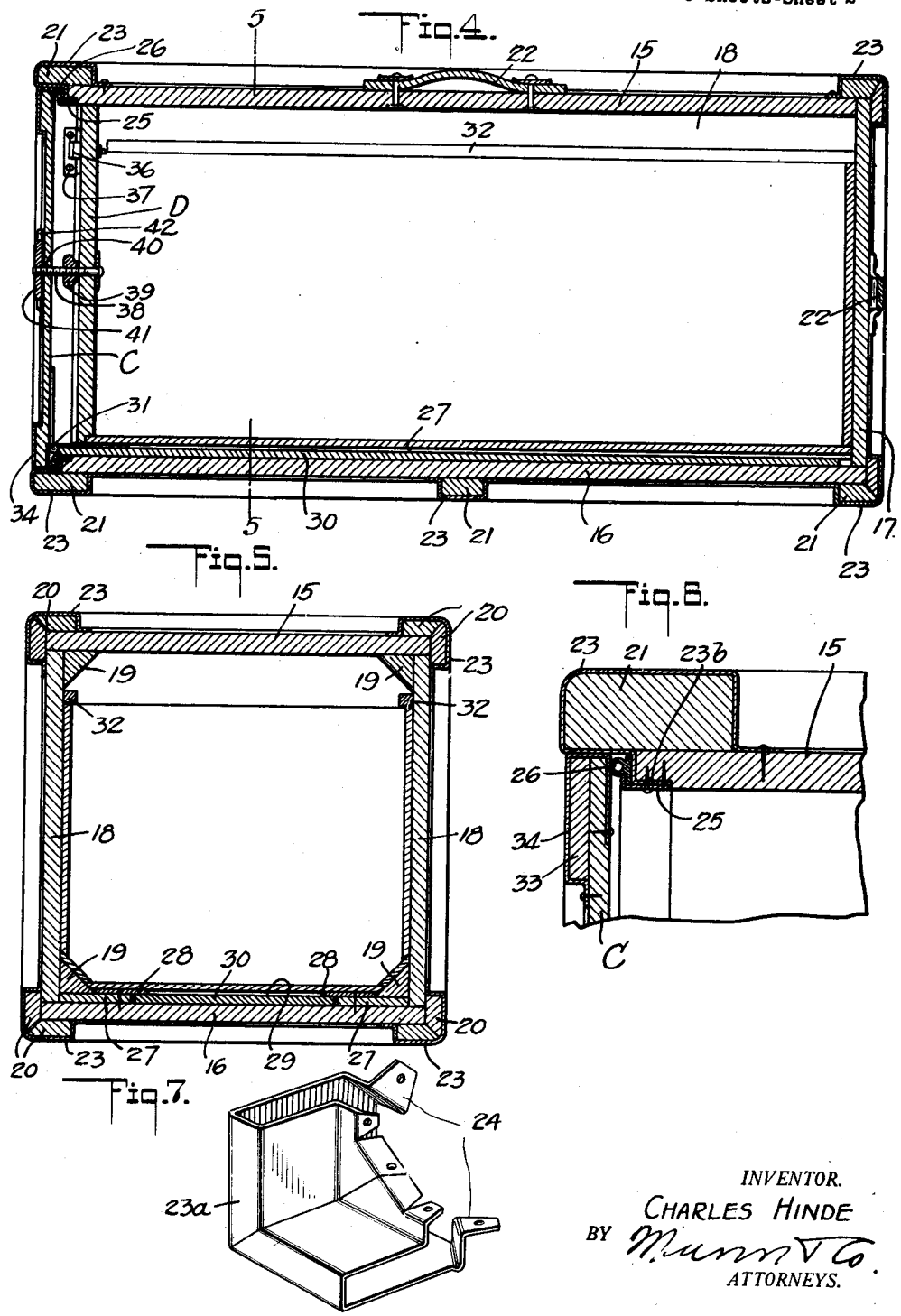

Oct. 18, 1927.
C. HINDE
1,645,992
PORTABLE CONTAINER
Filed April 1, 1925    3 Sheets-Sheet 3
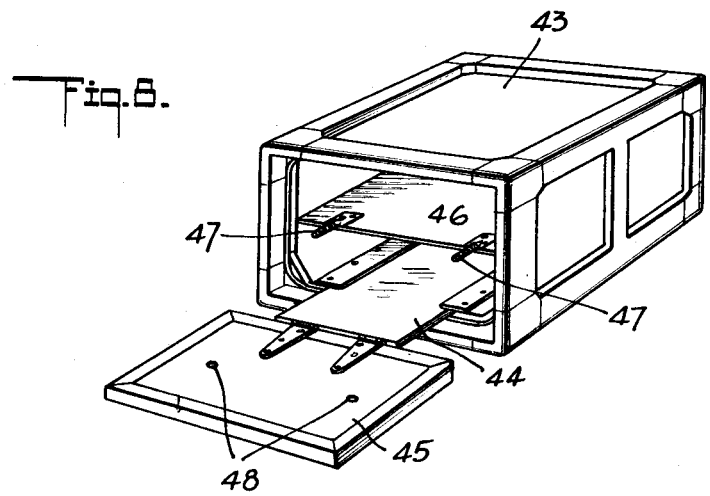
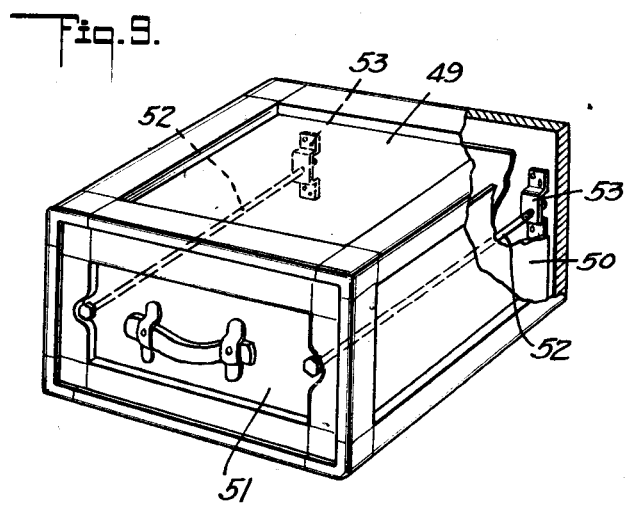   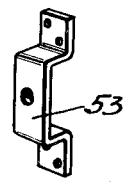
INVENTOR.
CHARLES HINDE
BY
ATTORNEYS.

Patented Oct. 18, 1927.

1,645,992

UNITED STATES PATENT OFFICE.

CHARLES HINDE, OF LOS ANGELES, CALIFORNIA.

PORTABLE CONTAINER.

Application filed April 1, 1925. Serial No. 19,915.

My invention relates to trunks, traveling cases, boxes, or any form of portable containers, which are adapted to be subjected to rough usage.

It is a purpose of my invention to provide a portable container of the above described character which is strong and durable to effectively withstand the roughest usage to which it might be subjected; a container which is constructed to permit ready access to its contents even when stacked with other containers of similar or dissimilar construction; a container constructed to permit flat stacking of a plurality of such containers yet having one or more of its exterior surfaces provided with projections and handles by which the handling of the container is facilitated; and a container having a closure member by which the contents of the container are effectively sealed against any fluid entering the container.

I will describe only three forms of portable containers embodying my invention, and will then point out the novel features thereof in claims.

In the accompanying drawings.

Figure 1 is a view showing in perspective one form of container embodying my invention in completely closed position.

Figure 2 is a view similar to Figure 1 showing the closure member thereof in open position.

Figure 3 is a view similar to Figure 2 with the drawer thereof in extended position.

Figure 4 is a vertical longitudinal sectional view of the container as illustrated in Figure 1.

Figure 5 is a transverse sectional view taken on the line 5—5 of Figure 4.

Figure 6 is an enlarged fragmentary vertical sectional view showing the fluid tight joint between the closure member and the body of the container.

Figure 7 is an enlarged detail perspective view of one of the corner binding elements embodied in the container shown in the preceding views.

Figure 8 is a perspective view of another form of container embodying my invention.

Figure 9 is a perspective view of a third form of container embodying my invention, a portion of the latter being broken away to reveal parts not otherwise described.

Similar reference characters refer to similar parts in each of the several views.

Referring specifically to the drawings, my invention in its present embodiment comprises a hollow body designated generally at B which in the present instance is of rectangular form with one end thereof open but normally closed by a closure member C. The body B, as illustrated to advantage in Figures 4 and 5, is constructed of a top section 15, a bottom section 16, an end section 17 and side sections 18. These sections consist of boards of wood or other suitable material connected at their confronting sides by strips 19 of wood or other suitable material, which strips as shown in Figure 5 are of triangular form in cross section. At the outer sides of the body the sections 15, etc. are connected by strips 20 extending longitudinally of the body and other strips 21 extending transversely of the body. The strips 20 are arranged in pairs and in spanning relation to the joints of the sections so as to thoroughly re-enforce the sections at their points of connection to form a container body of strong and durable construction. The transverse strips provide a similar advantage and co-operate with the longitudinal strips in providing projections on the several faces of the body which provide means by which the body can be manually gripped to facilitate handling of the container. Between the several strips 20 and 21 intervening recesses are formed on the several faces of the body, and secured to certain of the sections within these recesses are handles 22. These handles are used in manually moving the container and by virtue of the fact that they are disposed within the recesses of the body, it will be clear that they present no interference to the stacking of a plurality of similar containers one upon the other, or one beside the other.

As a further means for strengthening the container body and to protect the strips 20 and 21, binding elements 23 are provided. These elements 23 comprise sheets of metal or other suitable material bent to embrace and completely cover the strips 20 and 21 and provided with flanges 24 by which the elements are nailed or otherwise secured to the sections comprising the container body. The construction of the binding elements for the strips is clearly illustrated in Figures 4 and 5 with the exception of the corner binding elements designated at 23$^a$, the construction of which latter is clearly illustrated in Figure 7.

To accommodate the closure member C at the open end of the container body B it is necessary that the transverse strips 21 at the open end of the body extend beyond the sections of the body, and those binding elements 23 embrace such transverse strips and are extended inwardly and secured to the forward ends of the body sections as indicated at 23$^b$ in Figure 6. A securing strip 25 of metal or other suitable material is secured to the internal portions 23$^b$ of the body elements to co-operate with the latter in holding a compressible gasket 26 against the shoulders formed at the forward ends of the body sections. This gasket 26 is designed to provide a fluid tight joint between the closure member C and the body when the former is in closed position so as to make the container water tight.

As shown in Figures 4 and 5, the container body has secured to the inner side of the bottom section 16 guide strips 27 and 28, the strips being arranged in pairs spaced from each other to provide a channel 29 extending longitudinally of the container body, and the strips of each pair being arranged one above the other with the upper strip extending beyond one edge of the lower strip to provide lips for retaining a member 30 against upward displacement from the channel. This member 30 comprises in the present instance a plank of such dimensions as to have a sliding fit within the channel 29, and pivotally connected to the forward end of the member by means of hinges 31 is the closure member C. A drawer D is adapted for sliding movement within the container body and so as to be completely housed by the latter when fully inserted as illustrated in Figure 4. Limiting ribs 32 are secured to the inner sides of the side sections 18 to engage the upper edges of the drawer D so as to prevent movement of the drawer transversely of the body.

The closure member C as illustrated in Figure 4 is thickened at its edges as indicated at 33, and these thickened portions are covered by a metallic binding element 34 similar in construction to the elements 23. These thickened portions 33 provide a recess in the outer face of the closure member in which a handle 35 can be secured thus permitting the container to be set on end without interference from the handle.

As shown in Figure 3, the front or outer end of the drawer D is provided with a pair of latches 36 pivoted to occupy a released position as shown in Figure 3 and a latching position as shown in Figure 2 wherein the latches engage keepers 37 to retain the drawer as a unit in fixed position within the container body. With the drawer secured within the body, it can be utilized to retain the closure member C in closed position, and to this end the drawer is provided with a threaded shank 38 projecting from a head 39 disposed centrally of the forward end of the drawer. The closure member D is provided centrally with an opening 40 through which the threaded shank 38 is adapted to extend when the closure member is in closed position as shown in Figure 1. By applying a disc-shaped nut 41 to the projecting end of the shank 38, the closure member can be drawn into compressing engagement with respect to the gasket 26 thereby providing a fluid tight joint between the closure member and the container body. To facilitate manipulation of the nut 41, the latter is provided with radially extending arms 42.

In practice, the drawer D is adapted to contain the articles to be stored in the container, and by virtue of the fact that the drawer is insertable into or capable of being withdrawn from the container body to form one end of the latter, it will be manifest that a plurality of containers constructed in accordance with my invention can be stacked one upon the other without interfering with the application of the drawer to or from the container body. It will be further manifest that the mounting of the closure member permits the latter to be moved to open position and supported in open position in such manner as to prevent interference with the closure members of adjacent containers, and that when necessary the drawer can be supported in completely withdrawn position upon the closure member or upon the member 30, it being understood that by virtue of a sliding mounting of the member 30 in the channel 29 it can be projected various distances from the container body.

Referring now to Figure 8, I have here shown another form of container embodying my invention including a container body 43 constructed substantially in the same manner as the container body B and having slidably mounted therein a member 44 corresponding to the member 30 and hingedly supporting a closure member 45 thereon. The container body 43 is divided longitudinally into upper and lower compartments by means of a partition 46 suitably secured within the container body and provided with threaded shanks 47 adapted to extend through openings 48 in the closure member 45 to allow the application of nuts (not shown) but similar to the nut 41 for drawing the closure member into fluid tight engagement with the gasket 26. In this form of my invention drawers (not shown) can be received into the two compartments, or articles stored in each of the compartments.

Referring to Figure 9, I have here shown a third form of container embodying my invention and comprising a container body 49 constructed substantially in the same manner as the body B. A drawer 50 is removably fitted in the container and a closure member 51 similar to the closure member C is held in closed position by means of rods 52 extending through the closure member and drawer and threadedly engaging brackets 53 secured to the inner side of the end wall of the container body. These brackets are substantially of U form as illustrated in Figure 10 to allow of longitudinal adjustment of the rods in the brackets so that the closure member can be drawn into fluid tight engagement with the gasket 26.

Although I have herein shown and described only three forms of portable containers embodying my invention, it is to be understood that various changes and modifications may be made herein without departing from the spirit of the invention and the spirit and scope of the appended claims.

What I claim is:

1. A container comprising a hollow body having an opening therein, a drawer slidable in the body, a closure member for the opening, means for securing the drawer within the body, and means engaging the drawer for securing the closure member in closed position.

2. A container as embodied in claim 1 wherein a fluid tight joint is provided between the closure member and the body.

3. A container comprising a hollow body having an opening therein, a drawer removably fitted in the body, a closure member for the opening, means for securing the drawer within the body, and screw threaded means carried by the drawer and engaging the closure member for securing the latter in closed position.

4. A container as embodied in claim 3 wherein a compressible gasket is arranged to be interposed between the closure member and the body when the member is in closed position to provide a fluid tight joint between the two.

5. A container comprising a hollow body having one end thereof open, and formed internally with a flanged recess, a member removably fitted within the recess, a drawer slidable in the body, means for securing the drawer within the body, a closure member pivotally mounted on the first member, and means for securing the closure member in closed position with respect to the open end of the body.

6. A container comprising a hollow body having one end thereof open, and formed internally with a flanged recess, a member removably fitted within the recess, a drawer slidable in the body, means for securing the drawer within the body, a closure member hingedly supported on the first member to occupy an open position in which it is disposed on substantially the same plane as the member, and means by which the closure member can be secured in closed position with respect to the open end of the body.

7. A container comprising a hollow body, a drawer slidable in the body, means for securing the drawer against movement in the body, a closure member, a threaded member carried by the drawer and extended through the closure member, and a nut adapted to be applied to the threaded member at a point exteriorly of the closure member for securing the latter in closed position with respect to the body.

CHARLES HINDE.